(12) United States Patent
Nuimura

(10) Patent No.: US 7,852,413 B2
(45) Date of Patent: Dec. 14, 2010

(54) IMAGE DISPLAY APPARATUS AND CONTROL METHOD THEREOF

(75) Inventor: Yoshimi Nuimura, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1225 days.

(21) Appl. No.: 11/422,796

(22) Filed: Jun. 7, 2006

(65) Prior Publication Data

US 2006/0279564 A1 Dec. 14, 2006

(30) Foreign Application Priority Data

Jun. 14, 2005 (JP) .............................. 2005-173270

(51) Int. Cl.
  *H04N 5/91* (2006.01)
(52) U.S. Cl. ....................................... 348/687; 386/94
(58) Field of Classification Search ................ 348/687, 348/673, 725, 552, 553; 725/31; 386/94, 386/95
  See application file for complete search history.

(56) References Cited

U.S. PATENT DOCUMENTS

| | | | | |
|---|---|---|---|---|
| 6,826,352 B1 * | 11/2004 | Quan | .......................... | 386/94 |
| 6,836,549 B1 * | 12/2004 | Quan et al. | .................. | 380/221 |
| 7,248,784 B1 | 7/2007 | Kori et al. | | |
| 7,538,819 B2 * | 5/2009 | Horlander | .................... | 348/460 |
| 2004/0239816 A1 * | 12/2004 | Ando | ......................... | 348/705 |
| 2005/0039204 A1 * | 2/2005 | Neuman et al. | ................ | 725/31 |

FOREIGN PATENT DOCUMENTS

| | | |
|---|---|---|
| CN | 1147142 C | 4/2004 |
| JP | A 59-111489 | 6/1984 |
| JP | A 60-203078 | 10/1985 |
| JP | A 2-90788 | 3/1990 |
| JP | A 5-7350 | 1/1993 |
| JP | A 8-51579 | 2/1996 |
| JP | A 11-27602 | 1/1999 |
| JP | A 2000-75833 | 3/2000 |
| JP | A 2000-242212 | 9/2000 |
| JP | A 2001-016538 | 1/2001 |
| JP | A 2001-211433 | 8/2001 |
| JP | A 2002-343019 | 11/2002 |
| JP | A 2002-372943 | 12/2002 |

* cited by examiner

*Primary Examiner*—Paulos M Natnael
(74) *Attorney, Agent, or Firm*—Oliff & Berridge, PLC

(57) ABSTRACT

An image display apparatus that receives an input of a video signal and displays an image based on the video signal, includes: a copyguard detecting unit that detects whether or not the video signal is copyguarded; and a brightness adjusting unit that adjusts the brightness of the image on the basis of a detection result obtained by the copyguard detecting unit.

6 Claims, 6 Drawing Sheets ular channel from the television signals; an auxiliary signal inputting unit that receives an outout of video signals from an external image providing apparatus; a source selecting unit that

IMAGE DISPLAY APPARATUS AND CONTROL METHOD THEREOF

BACKGROUND

1. Technical Field

The present invention relates to an image display apparatus and a control method thereof, in which the image display apparatus receives an input of a video signal and displays an image based on the video signal.

2. Related Art

Generally, in an image display apparatus that displays an image by making phosphors to emit light with use of indicating elements, such as CRT (Cathode Ray Tube) and PDP (Plasma Display Panel), there is provided an automatic brightness limiter circuit (hereinafter referred to as "ABL circuit") in order to prevent problems arising out of high-brightness image display, such as the deterioration of display quality (image distortion) caused by high-voltage fluctuation and the degradation of indicating elements caused by heat generation (See JP-A-59-111489, JP-A-2-90788, JP-A-5-7350, JP-A-11-27602, JP-A-2000-75833, JP-A-2000-242212, and JP-A-2002-372943). The ABL circuit makes a correction for a video signal to limit the emission brightness of indicating elements when APL (Average Picture Level) of an inputted video signal is higher than a predetermined level.

On the other hand, in an image display apparatus that produces an image by modulating the light emitted from a light source with use of indicating elements such as LCD (liquid crystal display) and DMD (registered trademark) (Digital Micromirror Device), there is no deterioration of display quality (image distortion) arising out of high brightness. Hence, such an image display apparatus does not require an ABL circuit. In actuality, general image displays do not have an ABL circuit.

Such an image display apparatus that does not include an ABL circuit, however, has a problem that it gives a viewer stronger glare compared to the case of CRT or the like when an image is displayed based on a video signal having a high APL, causing the viewer discomfort. Particularly, a television commercial and the like are often constructed with stimulative and bright images so as to attract viewers attention even with use of CRT or the like having an ABL circuit, so that such images tend to have a higher APL. Further, the use of a large size screen or a dark viewing environment gives a viewer stronger glare, too.

On the other hand, in an image display apparatus having an ABL circuit, the ABL circuit restrains the above-referenced glare. However, the ABL circuit inevitably performs the function even for image works including a lot of visual stage effects, such as movie pictures. Therefore, there is still a problem that the above-referenced image display apparatus with an ABL circuit can not reproduce image expressions faithfully to producer's intention.

SUMMARY

An advantage of some aspects of the invention is to provide an image display apparatus capable of changing its brightness adjustment function depending on the types of images and a control method of the image display apparatus.

In accordance with an aspect of the invention, an image display apparatus that receives an input of a video signal and displays an image based on the video signal includes a copyguard detecting unit that detects whether or not the image signal is copyguarded, and a brightness adjusting unit that controls the brightness of the image on the basis of a detection result obtained by the copyguard detecting unit.

The image display apparatus can adjust brightness of an image in accordance with the presence or absence of a copyguard. Accordingly, it is possible to change brightness of an image differently between an image of movie pictures provided by commercially available DVDs, videotapes or pay-per-view television each containing a copyguard and an image provided by public television without copyguard. As a result, it is possible to view an image with the brightness according to the type of image.

In the image display apparatus, it is desirable that the brightness adjusting unit has the automatic brightness limiter that limits brightness of an image on the basis of brightness information indicated in a video signal and switches to enable or disable the brightness limiting by the automatic brightness limiter in response to a detection result obtained by the copyguard detecting unit.

The image display apparatus switches to enable or disable the brightness limiting by the automatic brightness limiter in accordance with the presence or absence of a copyguard, so that it is possible to view an image with the brightness according to the type of image.

In the image display apparatus, it is desirable that the brightness adjusting unit disables the brightness limiting by the automatic brightness limiter when the copyguard detecting unit has detected a copyguard incorporated in a video signal, and enables the brightness limiting by the automatic brightness limiter when the copyguard detecting unit has detected no copyguard incorporated in a video signal.

The image display apparatus disables the brightness limiting by the automatic brightness limiter when detecting a copyguard incorporated, so that it is possible to reproduce movie pictures or the like faithfully to producer's intention. In addition, it enables the brightness limiting by the automatic brightness limiter when detecting no copyguard incorporated, so that it is possible to reduce glare in viewing public television broadcasting, etc.

In the image display apparatus, it is desirable that the following are provided: a tuner that receives television signals and then selects to output a video signal of a particular channel from the television signals; an auxiliary signal inputting unit that receives an outout of video signals from an external image providing apparatus; a source selecting unit that receives an input of video signals which are outputted from both the tuner and the auxiliary signal inputting unit and then selects to output video signals from either the tuner or the auxiliary signal inputting unit; and a display unit that displays an image based on a video signal outputted from the source selectinging unit, wherein the brightness adjusting unit disables the brightness limiting by the automatic brightness limiter when the copyguard detecting unit has detected a copyguard incorporated in a video signal outputted from the source selecting unit, and enables the brightness limiting by the automatic brightness limiter when the copyguard detecting unit has detected no copyguard incorporated in a video signal outputted from the source selecting unit.

The image display apparatus can limit brightness of both images of television and images inputted from the auxiliary input depending on the presence or absence of a copyguard.

In the image display apparatus, it is desirable that the automatic brightness limiter limits brightness of an image by adjusting at least one of brightness and contrast of a video signal.

The image display apparatus limits brightness by adjusting a video signal, so that it is possible to adjust brightness of an image.

In the image display apparatus, it is desirable that the automatic brightness limiter makes a correction using at least either black stretching or white stretching in adjusting a video signal.

The image display apparatus performs black stretching and white stretching in addition to brightness control, so that it is possible to restrain contrast degradation associated with brightness control.

In the image display apparatus, it is desirable that a dimming-level adjusting unit is provided which adjusts dimming level when the automatic brightness limiter limits brightness.

The image display apparatus can change dimming level by means of the dimming-level adjusting unit, so that it is possible to view an image with the brightness according to a screen size, a viewing environment or viewer's tastes.

In the image display apparatus, it is desirable that the copyguard detecting unit detects at least one copyguard signal, superimposed in a video signal, of a Macrovision (registered trademark) system, Color Stripe and CGMS (Copy Generation Management System).

The image display apparatus can detect at least one copyguard signal of a Macrovision system, Color Stripe and CGMS which are widely adopted as a copyguard, so that it is possible to determine the type of an image for various image sources.

In accordance with another aspect of the invention, a control method is employed for an image display apparatus that receives an input of a video signal, displays an image based on the video signal, and includes an automatic brightness limiter for limiting the brightness of the image on the basis of brightness information indicated in the video signal. The control method includes the following steps: a first step of detecting whether or not the inputted video signal is copyguarded; and a second step of switching to enable or disable the brightness limiting by the automatic brightness limiter in response to a detection result obtained in the first step.

According to the control method of the image display apparatus, switching to enable or disable the brightness limiting by the automatic brightness limiter is performed depending on the presence or absence of a copyguard, whereby it is possible to view an image with the brightness in accordance with the type of image.

In the control method of the image display apparatus, it is desirable that the second step includes the following steps: disabling the brightness limiting by the automatic brightness limiter when any copyguard incorporated in a video signal is detected in the first step; and enabling the brightness limiting by the automatic brightness limiter when no copyguard incorporated in a video signal is detected in the first step.

According to the control method of the image display apparatus, the automatic brightness limiter is disabled to limit brightness when a video signal is copyguarded, so that it is possible to reproduce an image of movie pictures provided by commercially available DVDs or videotapes or pay-per-view television each containing a copyguard faithfully to producer's intention Moreover, the automatic brightness limiter is enabled to limit brightness when a video signal is not copyguarded, so that it is possible to reduce glare in viewing an image provided by public television broadcasting and the like without a copyguard.

When the above-described image display apparatus and the control method thereof are constructed with use of a computer provided in the image display apparatus, the aspects of the invention may be constructed with a program for realizing the functions of the image display apparatus or a recording medium that stores the program readably by the computer. As the recording medium, various types of media readable by the computer are available: for example, a flexible disk, a CD-ROM, a magneto-optical disk, an IC-card, a ROM cartridge, a punch card, a printed material with a code (e.g. a bar code, etc.) printed thereon, an internal memory device of a display apparatus (a memory such as RAM and ROM), an external storage device, etc.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an image display apparatus according to a first embodiment of the invention will be described with reference to the attached drawings.

Figure 1:
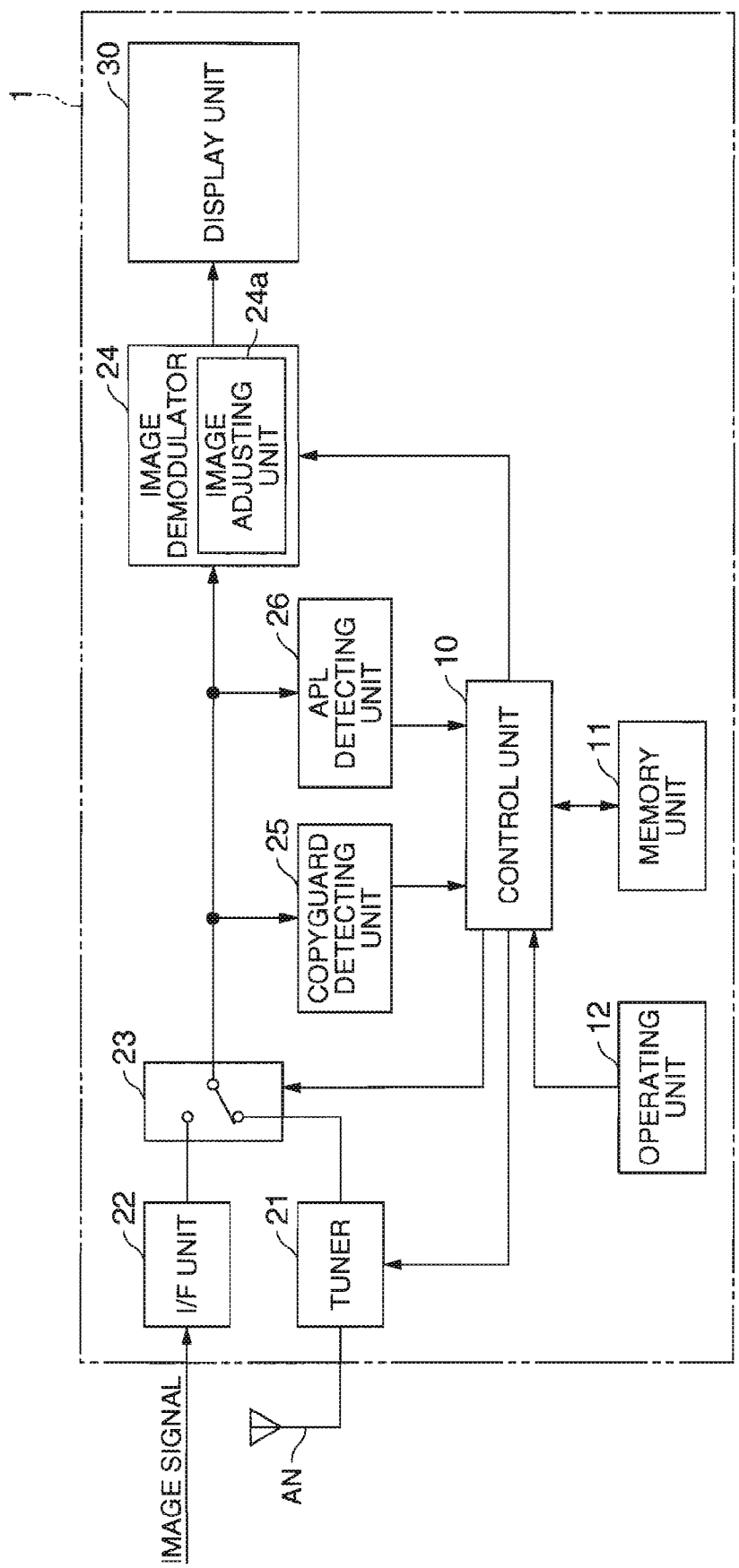
FIG. 1 is a block diagram schematically showing a construction of an image display apparatus according to a first embodiment of the invention.

FIG. 1 is a block diagram schematically showing a construction of an image display apparatus according to the embodiment. The image display apparatus according to the embodiment can receive television broadcast airwaves and display a television image based on the television broadcasting, and also can receive a video signal from an external image providing apparatus such as DVD (Digital Versatile Disk) players and videotape players and display an external video image based on the video signal.

As shown in FIG. 1, an image display apparatus 1 includes a control unit 10, a memory unit 11, an operating unit 12, a tuner 21, an I/F (interface) unit 22, a source selecting unit 23, an image demodulator 24, copyguard detecting unit 25, an APL detecting unit 26 and a display unit 30.

The control unit 10 is constituted by a CPU (Central Processing Unit), serving as a computer. The control unit 10, which is connected to each of the above-referenced components 11, 12, 21 and 23 to 26, performs integrated control of the operations of the image display apparatus 1 in accordance with a control program which is stored in the memory unit 11. The memory unit 11, which is constituted by a memory such as a flash ROM (Read Only Memory), stores the above-referenced control program, serving as a temporary memory for various set values and the like.

The operating unit 12 includes a plurality of keys for performing operations such as power on/off, broadcast channel selection, volume control, picture control, selecting of image source (a television image or an external video image). When a user operates the operating unit 12, the operating unit 12 outputs a control signal corresponding to each operation to the control unit 10.

The image display apparatus 1 is provided with an antenna AN connected to the outside thereof so as to be capable of receiving television broadcast airwaves. The received television broadcast airwaves are inputted as a received signal to the tuner 21. The tuner 21 picks up, from a received signal, a video signal of a broadcast channel selected by the operating unit 12 to output the signal to the source selecting unit 23.

The I/F unit 22 is a counterpart of the auxiliary signal inputting unit according to an embodiment of the invention and includes connecting terminals for inputting a video signal from an external image providing apparatus (not shown). A video signal inputted to the I/F unit 22 is outputted to the source selecting unit 23.

The source selecting unit 23 can select either a video signal inputted from the tuner 21 or a video signal inputted from the I/F unit 22 on the basis of an instruction of the control unit 10 so as to output a selected video signal to the image demodulator 24.

The copyguard detecting unit 25 detects whether or not a video signal outputted from the source selecting unit 23 is copyguarded. The copyguard is one that is incorporated in a video signal or a recording media storing the video signal so as to prevent a copy of images from being made with high quality for the purpose of copyright protection for movie pictures and so on. For example, video signals recorded on commercially available recording media or some television broadcast signals (e.g. pay-per-view television) are copyguarded. As a method of copyguard, methods for inducing a malfunction of VTR (Video Tape Recorder) and the like are in widespread use, where the following methods are used: a Macrovision system which is a method of superimposing false pulses in vertical blanking intervals of video signals, Color Stripe which is a method of modulating a phase of some color burst signals into out-of-phase in every plurality of lines, and CGMS which is a method of embedding, in a video signal, management information on a copy generation and whether or not to copy. Accordingly, the copyguard detecting unit 25 of the embodiment detects copyguard signals such as the above-referenced false pulses and the color burst signals modified into out-of-phase, thereby determining whether or not a video signal is copyguarded and then outputting a detection result to the control unit 10.

The APL detecting unit 26 includes a low-pass filter, an integrator circuit and so on (all not shown) and can detect APL (Average Picture Level) of a video signal outputted from the source selecting unit 23. The APL detecting unit 26 detects APL, for example, every 1 field to output a detection result to the control unit 10 as brightness information of the video signal.

The image demodulator 24 demodulates image information of an inputted video signal. Also, it, by means of an image adjusting unit 24a, adjusts brightness, contrast, hue, color saturation and the like of demodulated image information (demodulated signal) in accordance with preset standards or user's instructions inputted through the operating unit 12 and then produces demodulated signals for each of R (red), G (green), and B (blue) to output the signals to a display unit 30.

Here, the image adjusting unit 24a can control brightness in accordance with APL of a video signal to be inputted. More specifically, the control unit 10 has a predetermined threshold value Vth inside and outputs a control signal for lowering a signal level brightness level) of a demodulated signal to the image adjusting unit 24a when the level of an APL signal inputted from the APL detecting unit 26 is higher (brighter) than the threshold value Vth, whereby the image adjusting unit 24a limits brightness of an image. In other words, the control unit 10, the APL detecting unit 26, and the image adjusting unit 24a in this embodiment are counterparts of the automatic brightness limiter that limits brightness of an image depending on brightness information, APL. Incidentally, the brightness limiting performed on the basis of an APL signal by the automatic brightness limiter will be referred to also as an ABL control hereinafter.

Figure 2:
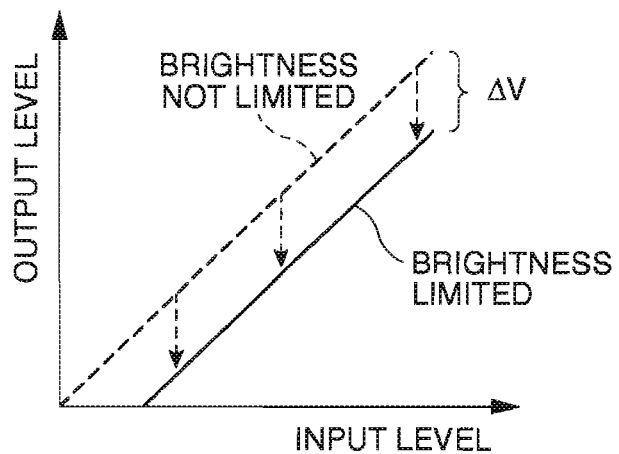
FIG. 2 is an explanatory drawing illustrating brightness limiting by adjusting brightness.

FIG. 2 is an explanatory drawing illustrating the brightness limiting by means of the image adjusting unit 24a, namely a graph showing the relationship between a signal level (an input level) of a demodulated signal inputted to the image adjusting unit 24a and a signal level (an output level) outputted from the image adjusting unit 24a. In this figure, a dashed line represents the case where the image adjusting unit 24a does not limit brightness, that is, the case where the input level is equal to the output level, and a solid line represents the relationship between the input and the output when the image adjusting unit 24a limits brightness.

As shown in FIG. 2, the embodiment is constructed such that brightness can be limited by adjusting brightness of a demodulated signal, i.e., by uniformly reducing an output level correspondent to each input level of the demodulated signal. Here, the reduction (dimming value $\Delta V$) is determined so as to optimize brightness of a display screen.

The reduction (dimming value $\Delta V$) can be changed by using the operating unit 12, thus allowing users to view an image with the brightness according to their tastes or the like by increasing and decreasing the reduction (dimming value $\Delta V$) in response to user's operation. In other words, the operating unit 12 and the control unit 10 also serve as the dimming-level adjusting unit that adjusts the dimming level of the image adjusting unit 24a.

Referring back to FIG. 1, the display unit 30 is constituted by a liquid crystal panel on which a lot of pixels each corresponding to RGB are arranged in a matrix, a backlight (both not shown) and so on. In the display unit 30, transmittance of each pixel is set on the basis of the demodulated signal outputted from the image demodulator 24, so that an image based on a video signal is displayed.

Next, the operations of the image display apparatus 1 of the embodiment will be described.

Figure 3:
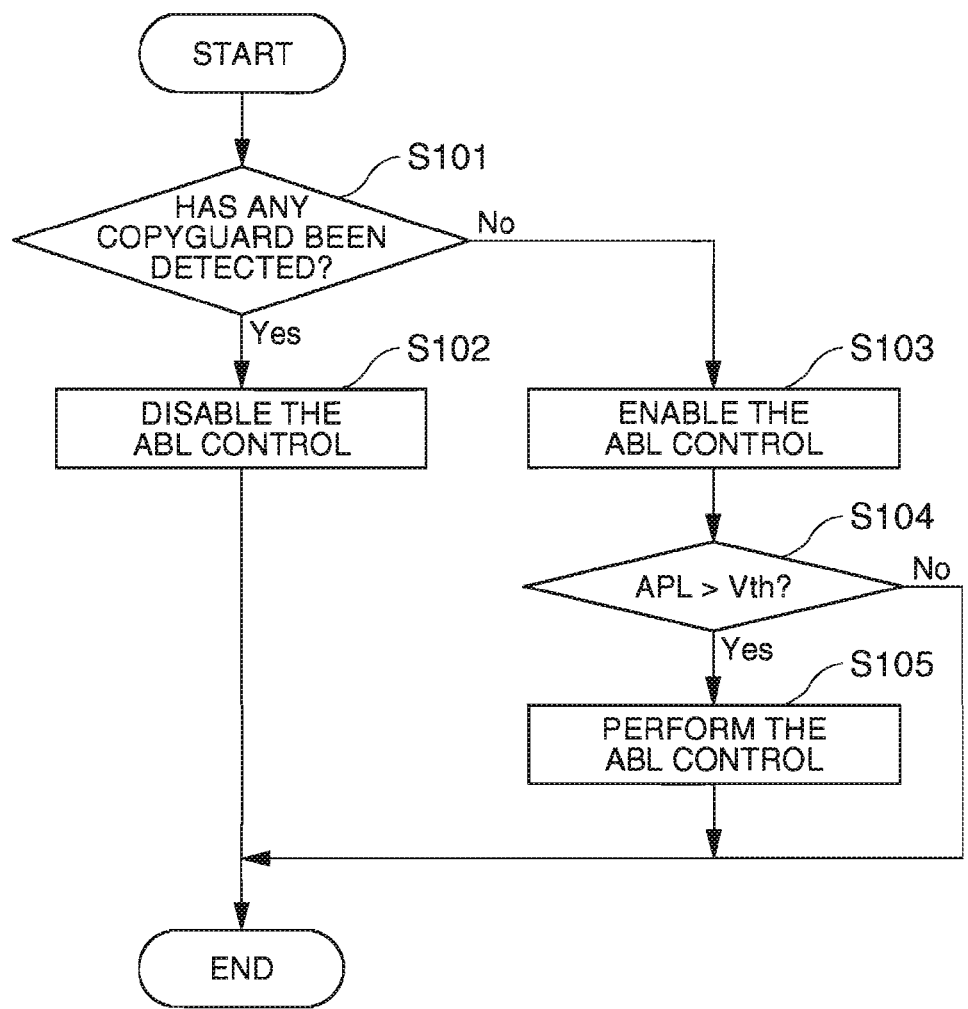
FIG. 3 is a flow chart illustrating the operations of a control unit for displaying an image.

FIG. 3 is a flow chart illustrating the operations of a control unit 10 when the image display apparatus 1 of the embodiment displays an image. The control unit 10 performs its control operations in accordance with the flow shown in FIG. 3 when a video signal has been inputted from the source selecting unit 23 to the image demodulator 24.

In Step S101, the control unit 10 receives an input of a detection result from the copyguard detecting unit 25 to determine whether or not the copyguard detecting unit 25 has detected any copyguard signal. The step moves to Step S102 when any copyguard signal has been detected, and it does to Step S103 when no copyguard signal has been detected.

When the step has been moved to Step S102 due to the detection of any copyguard signal, the control unit 10 controls the image adjusting unit 24a to disable an ABL control and then completes its operations. As a result, the image demodulator 24 outputs a video signal to the display unit 30 without limiting brightness of the video signal by the image adjusting unit 24a.

On the other hand, when the step has been moved to Step S103 due to the non-detection of any copyguard signal, the control unit 10 controls the image adjusting unit 24a to enable the ABL control and then moves to Step S104. As the result that the control unit 10 enables the ABL control, the image adjusting unit 24a can perform the ABL control, namely the brightness limiting according to APL.

In Step S104, the control unit 10 receives an input of an APL signal detected by the APL detecting unit 26 and then determines whether or not the level of the inputted APL signal is higher than the threshold value Vth. If the level of the APL signal is higher than the threshold value Vth, the step moves to Step S105. If the level of the APL signal is not higher than the threshold value Vth, the control unit 10 completes its operations without limiting brightness.

In Step S105, the control unit 10 performs an ABL control. In other words, it controls the image adjusting unit 24a to adjust (limit) brightness by a dimming value ΔV.

By repeating the above-mentioned operations for every 1 field, the image display apparatus 1 can limit brightness in accordance with the presence or absence of a copyguard and an APL of a video signal. Incidentally, the control unit 10, the image adjusting unit 24a and the APL detecting unit 26, which serve as an automatic brightness limiter, are also counterparts of the brightness adjusting unit of the embodiment because they switch to enable or disable an ABL control in response to a detection result of the copyguard detecting unit 25.

As described above, according to the image display apparatus 1 of the embodiment, the following effects can be obtained.

(1) According to the image display apparatus 1 of the embodiment, when a video signal is copyguarded, an ABL control is disabled. Accordingly, it is possible to reproduce an image of movie pictures and the like provided by commercially available DVDs, videotapes or pay-per-view television each containing a copyguard incorporated therein faithfully to producer's intention. Further, when a video signal is not copyguarded, an ABL control is enabled. Therefore, it is possible to reduce glare in viewing an image provided by public television broadcasting and the like without a copyguard.

(2) According to the image display apparatus 1 of the embodiment, the copyguard detecting unit 25 can detect a copyguard signal of a Macrovision system which is widely adopted as a copyguard. Therefore, it is possible to determine the type of image for various image sources.

(3) According to the image display apparatus 1 of the embodiment, the dimming level can be changed by using the operating unit 12. Therefore, it is possible for users to view an image with the brightness according to a screen size, a viewing environment or users' tastes.

(4) According to the image display apparatus 1 of the embodiment, brightness can be controlled by adjusting a demodulated signal. Therefore, it is possible to adjust brightness of an image easily.

Second Embodiment

An image display apparatus according to a second embodiment of the invention will be described with reference to the attached drawings.

Figure 4:
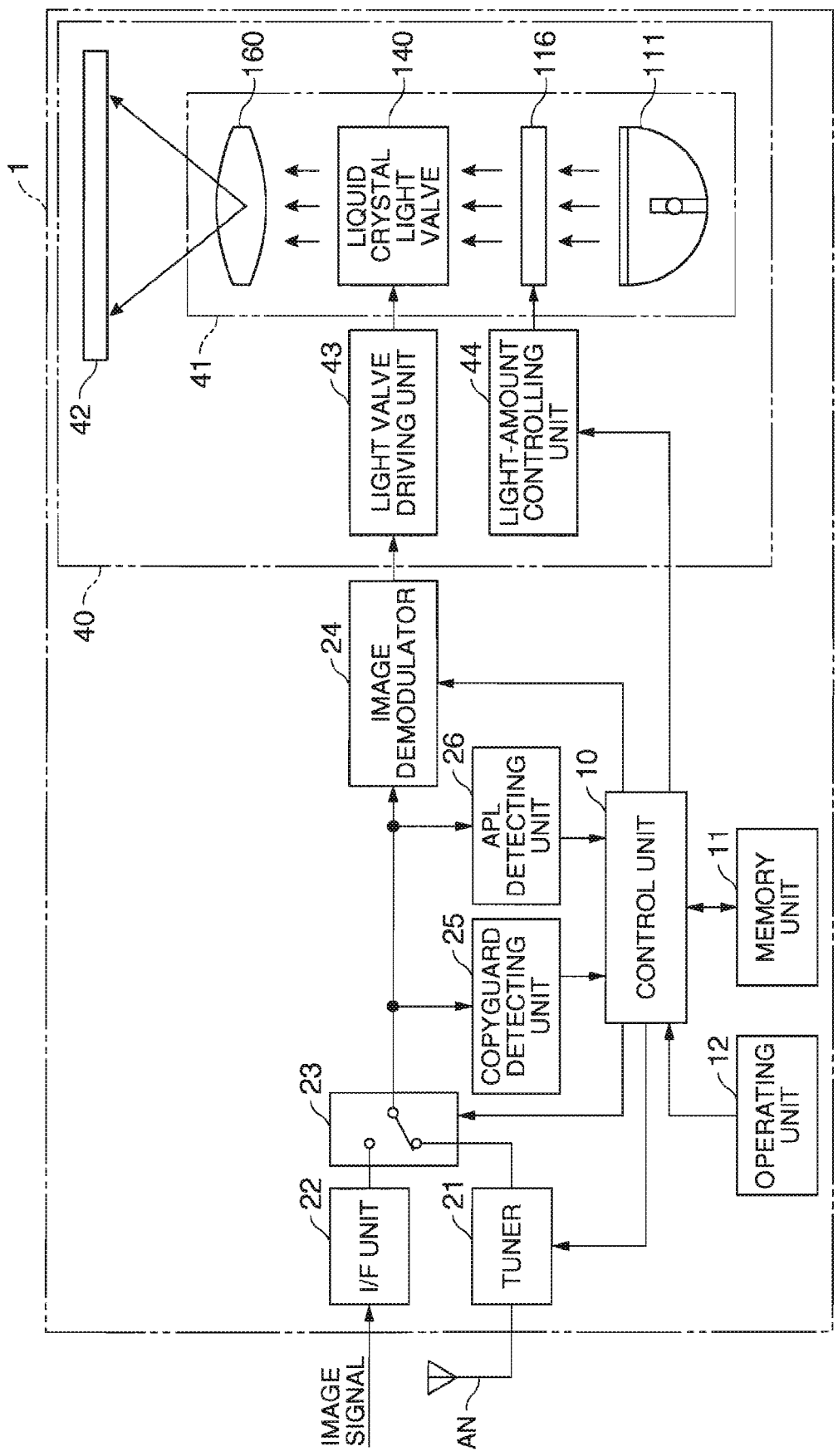
FIG. 4 is a block diagram schematically showing a construction of an image display apparatus according to a second embodiment of the invention.

FIG. 4 is a block diagram of an image display apparatus according to the embodiment, showing a rear-protection television in which the light emitted from a light source is modulated in accordance with a video signal, and the modulated light is projected onto the back of a transmissive screen, to thereby display an image on the front of the screen.

As shown in FIG. 4, a display unit 40 of the image display apparatus 1 of the embodiment includes the following: an optical device 41, a transmissive screen 42, a light-valve driving unit 43 that drives a liquid crystal light valve 140 provided to the optical device 41 in accordance with a demodulated signal inputted from the image demodulator 24 and a light-amount controlling unit 44 that controls a light-amount controlling device 116 provided to the optical device 41 in accordance with a control signal from the control unit 10.

Figure 5:
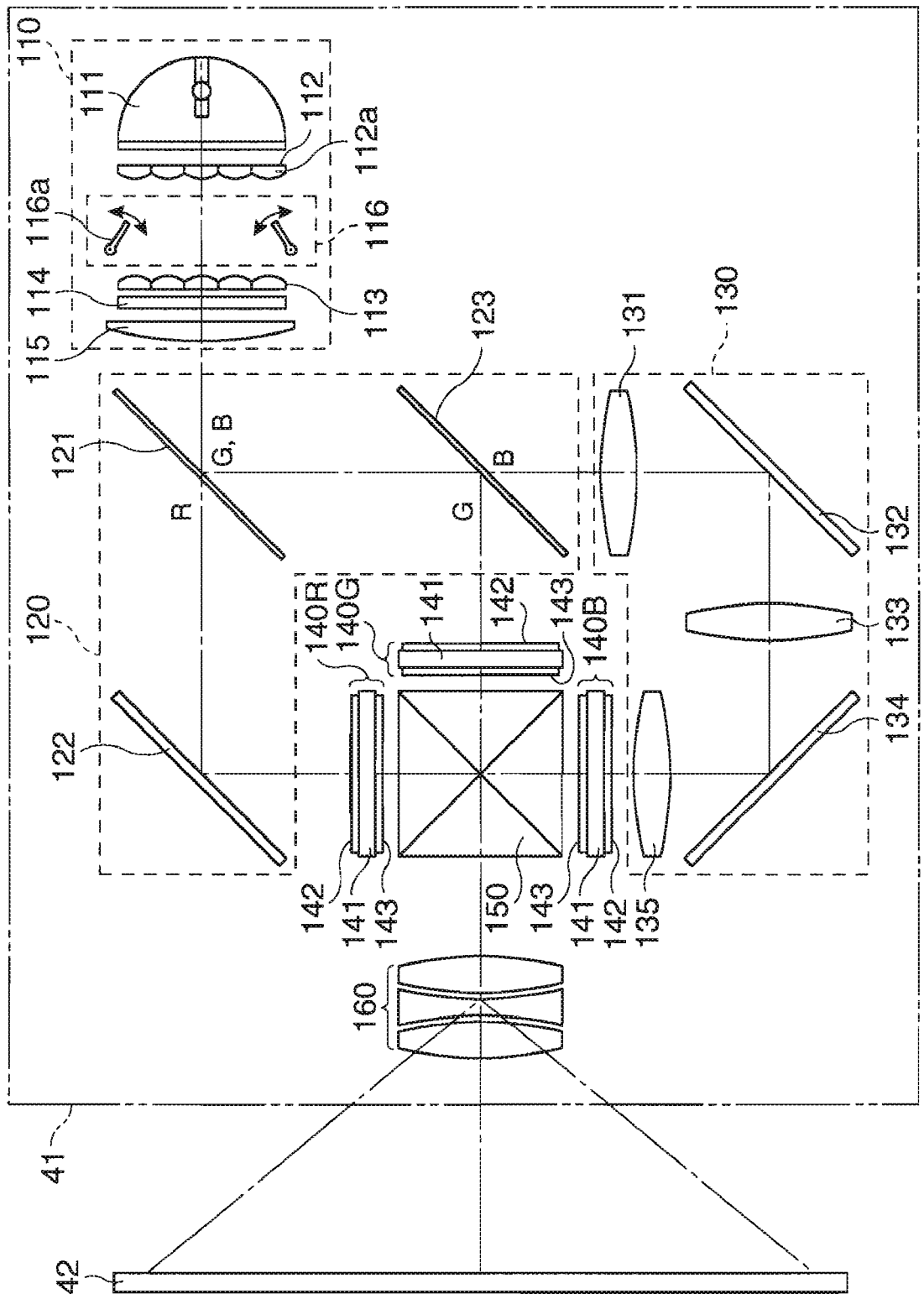
FIG. 5 is an explanatory drawing illustrating an optical device in detail.

FIG. 5 is an explanatory drawing illustrating the optical device 41 in detail, showing the light path through which the light emitted from a light source reaches a screen.

As shown in FIG. 5, the optical device 41 includes the following: an illumination optical system 110, a color light separation optical system 120, a relay optical system 130, three liquid crystal valves 140R, 140G and 140B each serving as a light modulator, a cross dichroic prism 150 and a projection lens 160.

The illumination optical system 110 includes the following: a light source 111 constituted by an electric-discharge light source lamp such as an extra high pressure mercury lamp or a metal halide lamp, a first lens array 112, a second lens array 113, a polarization converting device 114, a superposition lens 115 and a light-amount controlling device 116. A beam of light emitted from the light source 111 is divided into a lot of small beams of light by the first lens array 112 which is formed by arranging small lenses 112a in a matrix. The second lens array 113 and the superposition lens 115 are arranged such that respective divided beams of light illuminate the whole of the three liquid crystal light valves 140R, 140G and 140B to be illuminated. By this configuration, respective beams of light are overlapped at the liquid crystal light valves 140R, 140G and 140B, whereby the whole of the liquid crystal light valves 140R, 140G and 140B are almost uniformly illuminated.

In the light path between the first lens array 112 and the second lens array 113, the light-amount controlling device 116 is provided. The light-amount controlling device 116 can reduce the light emitted from the first lens array 112 by rotating louvers 116a. The reduction amount of light is controlled by a light-amount controlling unit 44 (See FIG. 4) on the basis of a control signal outputted from the control unit 10.

The polarization converting device 114 has a function for aligning the light emitted from the light source 111 in a form of polarized light having a particular polarizing direction so that the light from the light source 111 can be used efficiently at the liquid crystal valve 140R, 140G and 140B. The polarized light that emitted from the illumination optical system 110 enters the color light separation optical system 120.

The color light separation optical system 120 includes a first dichroic mirror 121, a reflection mirror 122 and a second dichroic mirror 123, and separates the light emitted from the illumination optical system 110 into three colors of light each having a different wavelength range. The first dichroic mirror 121 transmits red and near-red light, and at the same time reflects shorter-wavelength light than light to be transmitted. The red light R that has passed through the first dichroic mirror 121 is reflected by the reflection mirror 122 to illuminate the liquid crystal light valve 140R for red light.

Among the lights reflected by the first dichroic mirror 121, green light G is reflected by the second dichroic mirror 123 to illuminate the liquid crystal light valve 140G for green light. Further, blue light B passes through the second dichroic mirror 123, goes through the relay optical system 130, and then illuminates the liquid crystal light valve 140B for blue light.

Here, the path of the blue light B is longer than that of the other color lights, so that there may arise a problem that the illumination efficiency to the liquid crystal light valve 140B lowers due to the divergence of the light flux. To prevent this problem, the relay optical system 130 is provided in the path of the blue light B. The relay optical system 130 includes an incident-side lens 131, a first reflection mirror 132, a relay lens 133, a second reflection mirror 134 and an emission-side lens 135. The blue light B, emitted from the color light separation optical system 120, converges in the vicinity of the relay lens 133 through the incident-side lens 131, and then diverges toward the emission-side lens 135.

Each of the liquid crystal light valves 140R, 140G and 140B has a liquid crystal panel 141 in which liquid crystal is sealed in between a pair of transparent substrates. On the inside wall of the liquid crystal panel 141, transparent electrodes (pixel electrodes) capable of applying drive voltage to each small region (pixel) of the liquid crystals are formed in a matrix form. On the incident-side and emission-side surfaces of the liquid crystal panel 141, an incident-side polarizing plate 142 and an emission-side polarizing plate 143 are attached respectively. The incident-side polarizing plate 142 and the emission-side polarizing plate 143 can respectively transmit only a polarized light having a particular polarizing direction. Further, the incident-side polarizing plate 142 can transmit a polarized light having a polarizing direction aligned by the polarization converting device 114. Accordingly, most part of each color light that enters respective liquid crystal light valves 140R, 140G and 140B passes through the incident-side polarizing plate 142 and then enters the liquid crystal panel 141.

At this time, when the drive voltage according to a demodulated signal is applied to each pixel of the liquid crystal panel 141 by means of the light valve driving unit 43, the light which has entered the liquid crystal panel 141 is modulated in accordance with the drive voltage to be a polarized light having a different polarizing direction corresponding to respective pixels. With respect to the polarized light, only the polarization components capable of passing through the emission-side polarizing plate 143 are emitted from the liquid crystal light valves 140R, 140G and 140B. In other words, the liquid crystal light valves 140R, 140G and 140B transmit incident light at different transmission rates for respective pixels, whereby optical images with contrast are formed from each color light. The optical images made from each color light, which are emitted from the liquid crystal light valves 140R, 140G and 140B, enter a cross dichroic prism 150.

The cross dichroic prism 150 combines the optical images formed from each color emitted from the liquid crystal light valves 140R, 140G and 140B by each pixel, to thereby form an optical image representing a color image. An optical image combined by means of the cross dichroic prism 150 is enlarged and projected on the back of the transmissive screen 42 through the projection lens 160. The optical image, which has been formed with the injection on the back of the transmissive screen 42, passes through the transmissive screen 42 to be displayed on the front of the transmissive screen 42 as an image.

Referring back to FIG. 4, the image display apparatus 1 of the embodiment has such a structure as described above. Only when no copyguard signal is detected in a video signal to be inputted, the control unit 10 enables light-amount control by the light-amount controlling unit 44. When any copyguard signal is detected, the control unit 10 disables the light-amount control by the light-amount controlling unit 44 and fixes the louvers of the light-amount controlling unit 116 so as to keep the louvers fully open (not narrowing down the louvers).

When no copyguard signal is detected, namely when the light-amount control is effective, the APL signal detected by the APL detecting unit 26 is provided to the control unit 10. The control unit 10 outputs a control signal to the light-amount controlling unit 44 on the basis of the APL signal to control the light amount. More specifically, the control unit 10 contains a predetermined threshold value Vth inside and, only when the inputted APL signal is higher than the threshold value Vth, narrows down the louvers with use of the light-amount controlling device 116 through the light-amount controlling unit 44, to thereby adjust (limit) the brightness depending on an excess amount (correspondent to a dimming value $\Delta V$). When the APL signal is not higher than the threshold value Vth, the control unit 10 fully opens the louvers of the light-amount controlling device 116.

Incidentally, the light-amount controlling device 116, the light-amount controlling unit 44, the APL detecting unit 26 and the control unit 10 are counterparts of the automatic brightness limiter that limits brightness according to APL. In addition, given their function of switching to enable or disable the light-amount control according to a detection result obtained by the copyguard detecting unit 25, they are also counterparts of the brightness adjusting unit according to an embodiment of the invention.

As described above, according to the image display apparatus 1 of the embodiment, the following effects can be obtained in addition to the effects (1) to (3) of the above-describe first embodiment.

According to the image display apparatus 1 of the embodiment, the brightness is limited by reducing light source light. In other words, the adjustment of a demodulated signal (brightness adjustment, etc.) is not needed in limiting brightness, so that the range of available contrast can be prevented from reducing with the brightness limiting.

Third Embodiment

An image display apparatus according to a third embodiment of the invention will be described below with reference to the attached drawings.

Figure 6:
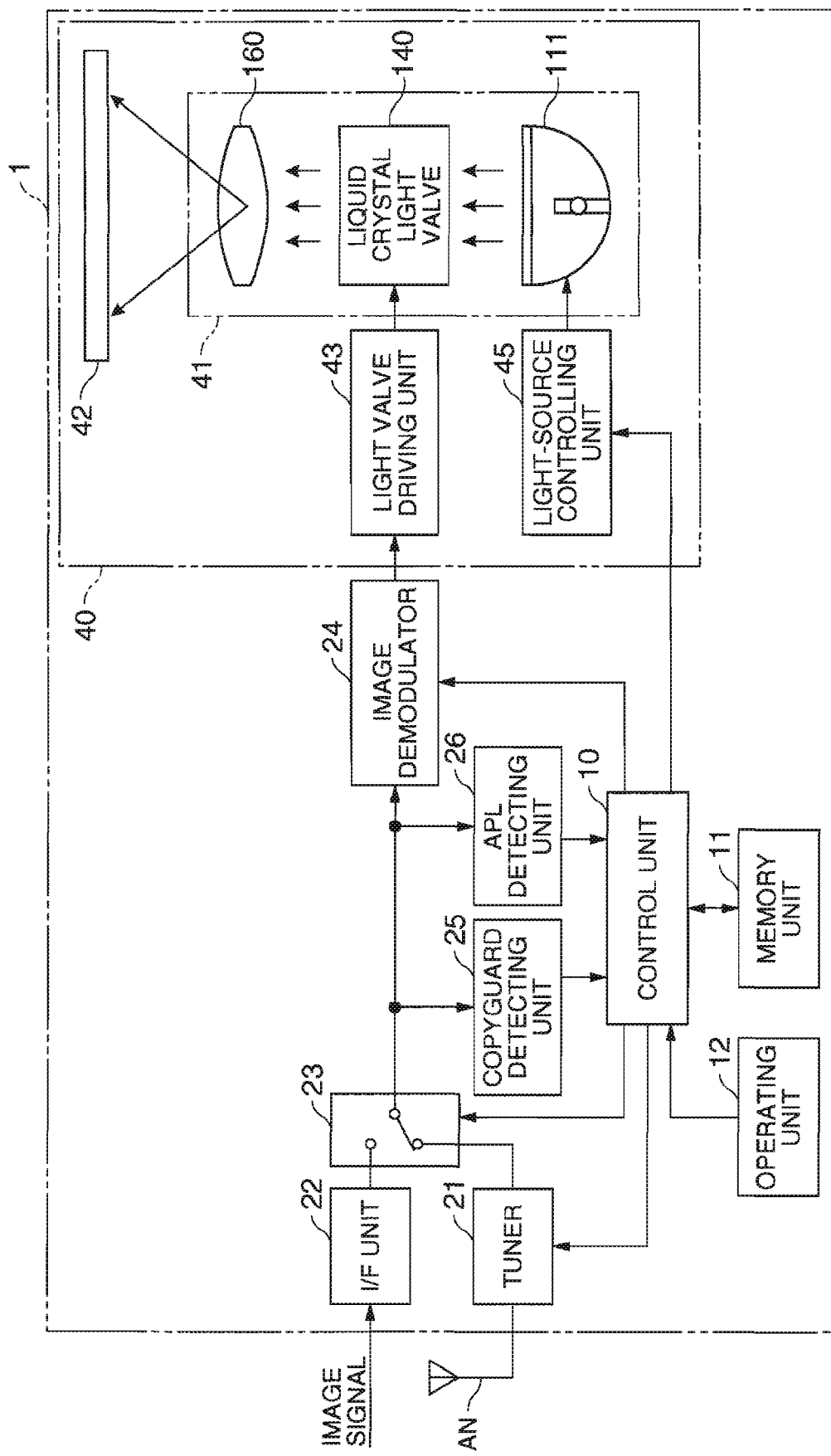
FIG. 6 is a block diagram schematically showing a construction of an image display apparatus according to a third embodiment of the invention.

FIG. 6 is a block diagram of an image display apparatus according to the embodiment, showing a rear-projection television in which, as in the second embodiment, the light emitted from a light source is modulated in accordance with a video signal, and the modulated light is projected onto the back of a transmissive screen, to thereby display an image on the front of the screen. Here, however, instead of the light-amount controlling device 116 and the light-amount controlling unit 44, a display unit 40 of the embodiment includes a light-source controlling unit 45 capable of controlling the amount of emission light from the light source 111 on the basis of the instruction of the control unit 10.

An image display apparatus 1 of the embodiment has such a construction as described above. Only when no copyguard signal is detected in a video signal to be inputted, the control unit 10 enables emission-light-amount control by the light-source controlling unit 45. When any copyguard signal is detected, the control unit 10 disables the control by the light-source controlling unit 45 and keeps the amount of emission light from the light source 111 invariant at a default value.

When no copyguard signal is detected, namely when the emission-light-amount control is effective, the APL signal detected by the APL detecting unit 26 is provided to the control unit 10. The control unit 10 outputs a control signal to the light-source controlling unit 45 on the basis of the APL signal to control the emission light amount. More specifically, the control unit 10 contains a predetermined threshold value Vth inside and, only when the inputted APL signal is higher than the threshold value Vth, adjusts the amount of emission light from the light source 111 through the light-source controlling unit 45, to thereby adjust (limit) brightness depending on an excess amount (correspondent to a dimming value $\Delta V$). When the APL signal is not higher than the threshold value Vth, the control unit 10 keeps the amount of emission light from the light source 111 invariant at a default value.

Incidentally, the light source 111, the light-source controlling unit 45, the APL detecting unit 26 and the control unit 10 are counterparts of the automatic brightness limiter that limits brightness according to APL. In addition, given their function of switching to enable or disable the emission-light-amount control according to a detection result obtained by the copyguard detecting unit 25, they are also counterparts of the brightness adjusting unit according to an embodiment of the invention.

As described above, according to the image display apparatus 1 of the embodiment, the same effects as the second embodiment can be obtained.

MODIFICATIONS

The embodiments of the invention may be modified as follows.

In the first to third embodiments, brightness is limited in accordance with both the presence or absence of a copyguard and APL. However, brightness may be controlled only depending on the presence or absence of a copyguard without relying on the APL.

In the second and the third embodiments, a rear-projection television with a transmissive screen 42 is described. However, a front projector that projects an image onto its external screen may be applied to the embodiments instead.

In the first embodiment, the image display apparatus 1 with a liquid crystal panel provided on the display unit 30 is described. However, as in the second and the third embodiments, a rear-projection television or a front projector with an optical device provided on its display unit may be applied to the embodiment instead. Further, a FED (Field Emission Display), CRT or PDP preliminarily having an ABL circuit or the like may be applied instead so that it is possible to view an image with different brightness in accordance with the presence or absence of a copyguard.

Figure 7:
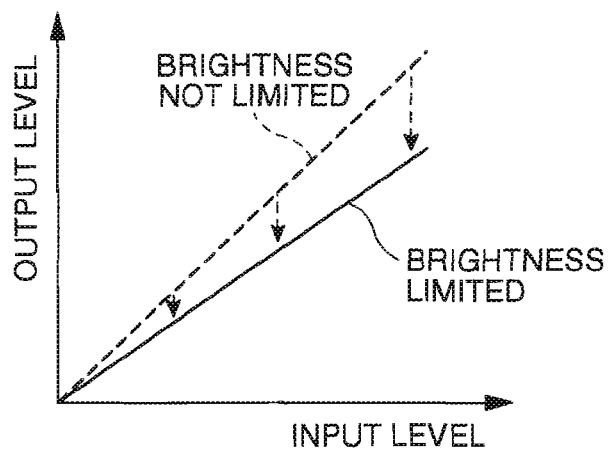
FIG. 7 is an explanatory drawing illustrating the brightness limiting by adjusting contrast.
Figure 8A:
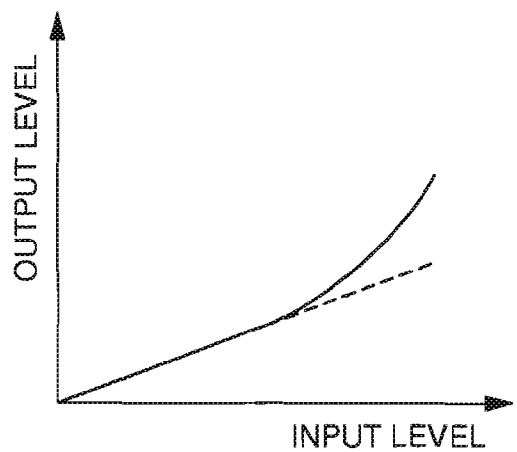
FIG. 8A is an explanatory drawing of a white stretching process.
Figure 8B:
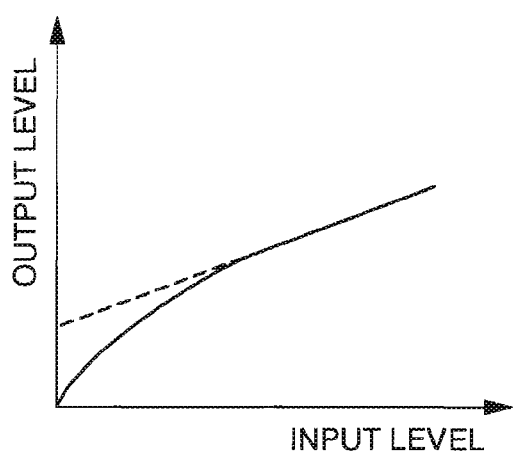
FIG. 8B is an explanatory drawing of a black stretching process.

In the first embodiment, brightness is limited by adjusting brightness of a demodulated signal. However, as shown in FIG. 7, contrast control of a demodulated signal, namely a processing for reducing the ratio of an output level for an input level of a demodulated signal may be performed. Further, brightness and contrast may be adjusted in combination. In addition, at least one of a white-stretching process shown in FIG. 8A and a black-stretching process shown in FIG. 8B may be applied to a demodulated signal having an adjusted brightness and contrast, to thereby compensate the deterioration of contrast.

In the second and the third embodiments, an electric-discharge light source lamp such as an extra high pressure mercury lamp or a metal halide lamp is used as the light source 111. However, other light sources such as an LED light source consisting of LED (Light-Emitting Diode) may be used. Particularly, in the third embodiment, the use of an LED light source enables minutely controlling the amount of an emission-light at ease.

In the third embodiment, brightness of an image is adjusted by controlling the emission-light amount from the light source. Likewise, also in the first embodiment, there may be employed such a structure that the emission-light amount from the backlight is controlled instead of using the image adjusting unit 24a.

In the second embodiment, not only one that reduces light amount by means of the louver 116a, but also other reduction mechanisms such as diaphragm blades may be used as the light-amount controlling device 116. Further, liquid crystal element, electrochromic material glass or the like that can change the transmittance for light depending on applied voltage may be used to be provided in the middle of the light path leading from the light source 111 to the transmissive screen 42, or in the front of the transmissive screen 42.

The image display apparatus 1 of the first to the third embodiments are constructed so as to be capable of receiving an input of a video signal from an external image providing apparatus such as a DVD player. However, the image display apparatus 1 itself may include an image providing apparatus. Generally, a lot of commercially available DVDs store copyguard information, which indicates whether or not a copyguard is incorporated, in a different area from the main video information. DVD players include a copyguard information reading unit that can read the copyguard information and a copyguard signal superimposing unit that superimposes a copyguard signal on a video signal in accordance with the read copyguard information so as to be capable of outputting a video signal having a copyguard signal superimposed to an image display apparatus. Therefore, if an image display apparatus includes an image providing apparatus such as a DVD player, the copyguard information reading unit can be used to know whether or not the image stored in a DVD is copyguarded, without use of a video signal having a copyguard signal superimposed. Consequently, the copyguard information reading unit can serve as a copyguard detecting unit.

In the second and the third embodiments, transmissive liquid crystal light valves 140 (140R, 140G and 140B) are used to modulate light source light. However, LCOS (Liquid Crystal On Silicon) or the like which is a reflective light-modulator may be used, too. Additionally, a DMD or the like may be used that modulates the light emitted from a light source by controlling the emission direction of the emitted light for each micro-mirror serving as a pixel.

The entire disclosure of Japanese Patent Application No. 2005-173270, filed Jun. 14, 2005 is expressly incorporated by reference herein.

What is claimed is:

1. An image display apparatus that receives an input of a video signal and displays an image based on the video signal, comprising:
   a copyguard detecting unit that detects whether or not the video signal is copyguarded; and
   a brightness adjusting unit that adjusts a brightness of the image on the basis of a detection result obtained by the copyguard detecting unit;
   wherein the brightness adjusting unit includes an automatic brightness limiter that limits the brightness of the image on the basis of brightness information indicated in the image signal, and switches to enable or disable the brightness limiting by the automatic brightness limiter in response to a detection result obtained by the copyguard detecting unit;
   the brightness adjusting unit disables the brightness limiting by the automatic brightness limiter when the copyguard detecting unit has detected a copyguard incorporated in the image signal, and enables the brightness limiting by the automatic brightness limiter when the copyguard detecting unit has detected no copyguard incorporated in the image signal, wherein the automatic brightness limiter limits brightness of an image by adjusting at least either the brightness or a contrast of the video signal; and the automatic brightness limiter makes a correction using at least either black stretching or white stretching when adjusting the video signal.

2. The image display apparatus according to claim 1, further comprising a dimming-level adjusting unit that adjusts dimming level when the automatic brightness limiter limits brightness.

3. The image display apparatus according to claim 1, wherein the copyguard detecting unit detects at least one copyguard signal, superimposed in the video signal, of a Macrovision (registered trademark) system, Color Stripe and CGMS (Copy Generation Management System).

4. An image display apparatus that receives an input of a video signal and displays an image based on the video signal, comprising:

a copyguard detecting unit that detects whether or not the video signal is copyguarded;

a brightness adjusting unit that adjusts a brightness of the image on the basis of a detection result obtained by the copyguard detecting unit, wherein the brightness adjusting unit includes an automatic brightness limiter that limits the brightness of the image on the basis of brightness information indicated in the image signal, and switches to enable or disable the brightness limiting by the automatic brightness limiter in response to a detection result obtained by the copyguard detecting unit, and the brightness adjusting unit disables the brightness limiting by the automatic brightness limiter when the copyguard detecting unit has detected a copyguard incorporated in the image signal, and enables the brightness limiting by the automatic brightness limiter when the copyguard detecting unit has detected no copyguard incorporated in the image signal, a tuner that receives a television signal and selects to output a video signal of a particular channel from the television signal;

an auxiliary signal inputting unit that receives an output of a video signal from an external image providing apparatus;

a source selecting unit that receives an input of a video signal which is outputted from both the tuner and the auxiliary signal inputting unit and selects to output a video signal from either the tuner and the auxiliary signal inputting unit; and a display unit that displays an image based on a video signal outputted from the source selecting unit, wherein the brightness adjusting unit disables the brightness limited by the automatic brightness limiter when the copyguard detecting unit has detected a copyguard incorporated in a video signal which is outputted from the source selecting unit, and enables the brightness limiting by the automatic brightness limiter when the copyguard detecting unit has detected no copyguard incorporated in a video signal outputted from the source selecting unit.

5. A control method of an image display apparatus that receives an input of a video signal, displays an image based on the video signal, and includes an automatic brightness limiter for limiting the brightness of the image on the basis of brightness information indicated in the video signal, comprising:

a first step of detecting whether or not the inputted video signal is copyguarded; and a second step of switching to enable or disable the brightness limiting by the automatic brightness limiter in response to a detection result obtained in the first step, wherein the second step includes:

disabling the brightness limiting by the automatic brightness limiter when a copyguard incorporated in the image signal has been detected in the first step; and enabling the brightness limiting by the automatic brightness limiter when no copyguard incorporated in the image signal has been detected in the first step.

6. An image display apparatus that receives an input of a video signal and displays an image based on the video signal, comprising:

a copyguard detecting unit that detects whether or not the video signal is copyguarded; and a brightness adjusting unit that adjusts a brightness of the image on the basis of a detection result obtained by the copyguard detecting unit, wherein the brightness adjusting unit includes an automatic brightness limiter that limits the brightness of the image on the basis of brightness information indicated in the image signal, and switches to enable or disable the brightness limiting by the automatic brightness limiter in response to a detection result obtained by the copyguard detecting unit, the automatic brightness limiter limits brightness of an image by adjusting at least either the brightness or a contrast of the video signal, and the automatic brightness limiter makes a correction using at least either black stretching or white stretching when adjusting the video signal.

* * * * *